(12) United States Patent
Wray (10) Patent No.: US 10,405,402 B2
(45) Date of Patent: Sep. 3, 2019

(54) POWER CONSERVATION FOR DISTRIBUTED LIGHTING SYSTEM

(71) Applicant: Donald L. Wray, Ocala, FL (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 16/164,257

(22) Filed: Oct. 18, 2018

(65) Prior Publication Data

US 2019/0116648 A1    Apr. 18, 2019

Related U.S. Application Data

(60) Provisional application No. 62/573,819, filed on Oct. 18, 2017.

(51) Int. Cl.
H02J 9/06         (2006.01)
H05B 33/08        (2006.01)
H05B 37/02        (2006.01)

(52) U.S. Cl.
CPC ............ *H05B 37/0245* (2013.01); *H02J 9/06* (2013.01); *H05B 33/0884* (2013.01)

(58) Field of Classification Search
CPC .... H05B 37/0245; H05B 33/0884; H02J 9/06
USPC ......................................................... 315/86
See application file for complete search history.

(56) References Cited

U.S. PATENT DOCUMENTS

| | | | |
|---|---|---|---|
| 2012/0280637 A1* | 11/2012 | Tikkanen | H05B 33/0803 315/294 |
| 2012/0306378 A1* | 12/2012 | Oh | H05B 37/0272 315/151 |
| 2014/0177301 A1* | 6/2014 | Kim | H02M 7/23 363/84 |
| 2015/0373812 A1* | 12/2015 | Feri | H05B 37/0245 315/152 |
| 2017/0215252 A1* | 7/2017 | Wells | H05B 37/0218 |
| 2017/0231069 A1* | 8/2017 | Winslett | H05B 33/0803 |
| 2018/0145846 A1* | 5/2018 | Vangeel | H04L 12/2827 |
| 2018/0249533 A1* | 8/2018 | Sohn | H04W 84/18 |

\* cited by examiner

*Primary Examiner* — Don P Le
(74) *Attorney, Agent, or Firm* — St. Onge Steward Johnston & Reens LLC (57) ABSTRACT

A distributed lighting control system that minimizes or eliminates standby power usage in a low voltage lighting system where a digital power module is adapted to receive at least one control signal and to transmits an output control signal on one or more output ports to control various fixture control modules each having associated LED light fixtures, the digital power module functioning to shut off the transmission of electrical power to the fixture control modules to prevent standby power usage by the fixture control modules.

30 Claims, 5 Drawing Sheets

POWER CONSERVATION FOR DISTRIBUTED LIGHTING SYSTEM

FIELD OF THE INVENTION

The invention relates to a distributed lighting system and, more specifically, to enhanced power conservation for a distributed low voltage lighting system and method.

BACKGROUND OF THE INVENTION

Distributed lighting systems typically have a central controller and have distributed/remote light fixtures connected to and controlled by the central controller, whereby the central controller receives power from a power source and receives control signals from one or more control inputs, and, in turn, provides power and control signals to the light fixtures. For example, multiple Light Emitting Diode (LED) light fixtures, which typically use a very small amount of electrical power as compared to "standard" light fixtures that use incandescent or fluorescent lamps, can be connected to central controller by low voltage wiring, which provides both power and control to the LED light fixtures.

While the power usage by LED light fixtures is substantially less than the power usage of standard light fixtures, there is still a need to address unnecessary power losses in distributed low voltage light systems. For example, in a standard type lighting system, a wall switch or the like will transmit electrical power to an associated light fixture when control circumstances are met. These could include, the wall switch is turned on by a user, or a dimmer switch is activated, or an occupancy sensor senses movement in a space, and so on. When the control circumstance is not met, electrical power to the connected light fixture is interrupted. However, in a distributed low voltage lighting system LED light fixtures are controlled by commands that have address data associated therewith such that when multiple light fixtures are attached to a single supply line, commands are acted on only by light fixtures that match the address of the transmitted data. In other words, many different light fixtures could function in many different ways based on the coded instructions sent to the light fixtures. A simple way to do this is with address matching where a command has an associated address and only light fixtures with that address will execute that particular command. This means that many different commands could be transmitted on a signal line (which can also function as the power transmission line to the connected light fixtures) but if none of the commands match addresses of the connected light fixtures, none of the connected light fixtures will execute any of the commands. So in effect, electrical power may be transmitted to multiple LED light fixtures, even when none of the connected LED light fixtures are being activated.

For distributed LED lighting systems this can lead to unnecessary power drain due to powering the LED light fixtures (or the associated equipment therewith) while not actually turning the LED light fixtures on. In the field of consumer electronics this function has been called standby power draw or "vampire current" referring to the way electronic current is consumed while the equipment is not in use. In fact, the Department of Energy has estimated that vampire devices accounts for 10% of energy used in an average home.

As stated previously, since standard lighting systems have traditionally worked by fully interrupting power to the attached light fixtures, the issue of standby power draw has not been a problem for known lighting systems. However, with the change to distributed low voltage lighting systems, this has become a problem for systems that combine both power distribution and lighting control signals onto a single output channel. As such, known distributed lighting systems do not adequately conserve power during periods of non-use.

SUMMARY OF THE INVENTION

What is desired then is a system and method to allow for the both power and control signals to be transmitted on a single channel to a plurality of connected LED light fixtures that mitigates or eliminates standby power draw.

The distributed lighting system includes a central controller, a Digital Power Module (DPM), which is coupled to at least one remote/distributed Fixture Control Module (FCM) that controls an associated light fixture (e.g., an LED light fixture). The DPM may comprise a plurality of lighting channels/ports, each of which may be connected to a plurality of FCMs. The DPM can include an Alternating Current (AC) input (e.g., 120V/277V), and a direct current (DC) output from a power supply (e.g., 48V) for each lighting channel.

In one configuration, the DC power is transmitted to the FCMs via low-voltage wiring, such as class 2 wiring which could comprise CAT 5/6/6E cable. The FCMs can be connected to the wiring cable in parallel, such as, in a daisy chain configuration. In this manner, a failure of any single FCM (e.g., the FCM fails open) would not adversely affect any of the remaining FCMs (and therefore the other light fixtures) connected to the channel. The DPM also provides control signals to the FCMs, such as digital control signals (e.g., DMX), via the low-voltage wiring and/or wirelessly. The control signals can include data addresses and the FCMs can be configured to receive control signals based on pre-set and/or user-selectable addresses.

The DPM can have several analog 0-10V inputs and digital inputs. The 0-10V inputs on the DPM may originate from a dimmer switch (such as a wall-mounted slide-type dimmer), or from a daylight sensor, or from an occupancy sensor, or the like. However, it will be understood by those of skill in the art that occupancy sensors are typically contact closure inputs.

The DPM includes a control module having a processor (which may comprise a Microprocessor, a Field Programmable Gate Array, a Digital Signal Processor, a Microcontroller or the like) and transmitter/transceiver for processing control inputs and for transmitting control signals to the FCM(s), for example via the low voltage wiring and/or wirelessly. Each FCM is operable to receive the control signal(s) transmitted from the DPM and is operable to control drivers which drive the various color channels of the lighting fixture, which may include pulse-width modulation (PWM) and/or other methods and techniques. The FCMs may be provided with a receiver/transceiver and processor for receiving and processing the control signals and for controlling the drivers. The FCMs may also be operable to transmit information and/or control signals to the DPM in the same manner.

As previously described, one major drawback that this type of system faces is standby power draw when the FCMs connected to the DPM are receiving electrical power transmitted via the output, however, none of the LED light fixtures associated with the FCMs are being turned on. The electronics in the various FCMs, which may comprise a processor and other associated electronics, will consume power even when no control signals are being processed to control the associated LED light fixture.

Accordingly, in one configuration, it is conceived that the DPM could include a processor that will determine if any of the control signals to be sent on the output of the DPM to the various FCMs connected to the output comprise a match and if not, the DPM will cease transmitting electrical power to the FCMs. This could be accomplished by the provision of a set of contacts that could be controlled by the processor in the DPM such that, in the event no control signal matching an FCM connected to the output of the DPM is to be sent, the DPM opens the set of contacts thereby interrupting the flow of electricity to FCMs. It is contemplated that these set of contacts could be positioned in the controller in the FCM and could, in one embodiment, be connected to or integral to the processor.

The system could be programmed such that if multiple FCMs are connected to an output of the DPM, and none of the FCMs have an address that would match any of the instructions (or any "on" instructions) or if no instructions (or no "on" instructions) are currently being sent, then the DPM could shut off the power transmitted on the output. This would function to prevent any standby power draw because no power would be sent to the FCMs to be consumed.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one configuration a lighting control system is provided comprising a digital power module (DPM) including a control module, a power supply, a power outlet, at least one control input and a digital output that is based on the at least one control input. The lighting control system further comprises a fixture control module (FCM) connected to the digital output, the FCM adapted to receive power from the DPM for powering an LED light fixture associated with the FCM. The system is provided such that the DPM is adapted to receive a control signal on the at least one control input and for transmitting a control signal on the digital output for controlling the FCM. The system is further provided such that when the control signal received by the DPM comprises an off signal, the control module is adapted to cause the DPM to cease sending power via the power output and when the control signal received by the DPM comprises an on signal, the control module is adapted to cause the DPM to transmit power over the power output and is adapted to operate the LED light fixture according to the received control signal.

In another configuration a lighting control system is provided comprising a digital power module (DPM) including a control module, a power supply, a power output, at least one control input and a digital output that is based on the at least one control input. The system further comprises a fixture control module (FCM) having an address and connected to the digital output, the FCM adapted to receive power from the DPM for powering an LED light fixture associated with the FCM. The system is provided such that the DPM is adapted to receive a control signal on the at least one control input and for transmitting a control signal on the digital output to an address. The system is further provided such that when the control signal received by the DPM comprises a signal for turning off the LED light fixture, no power is transmitted by the power output and when the control signal received by the DPM comprises a signal for turning on the LED light fixture, power is transmitted by the power output and the FCM is adapted to operate the LED light fixture according to the received control signal.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
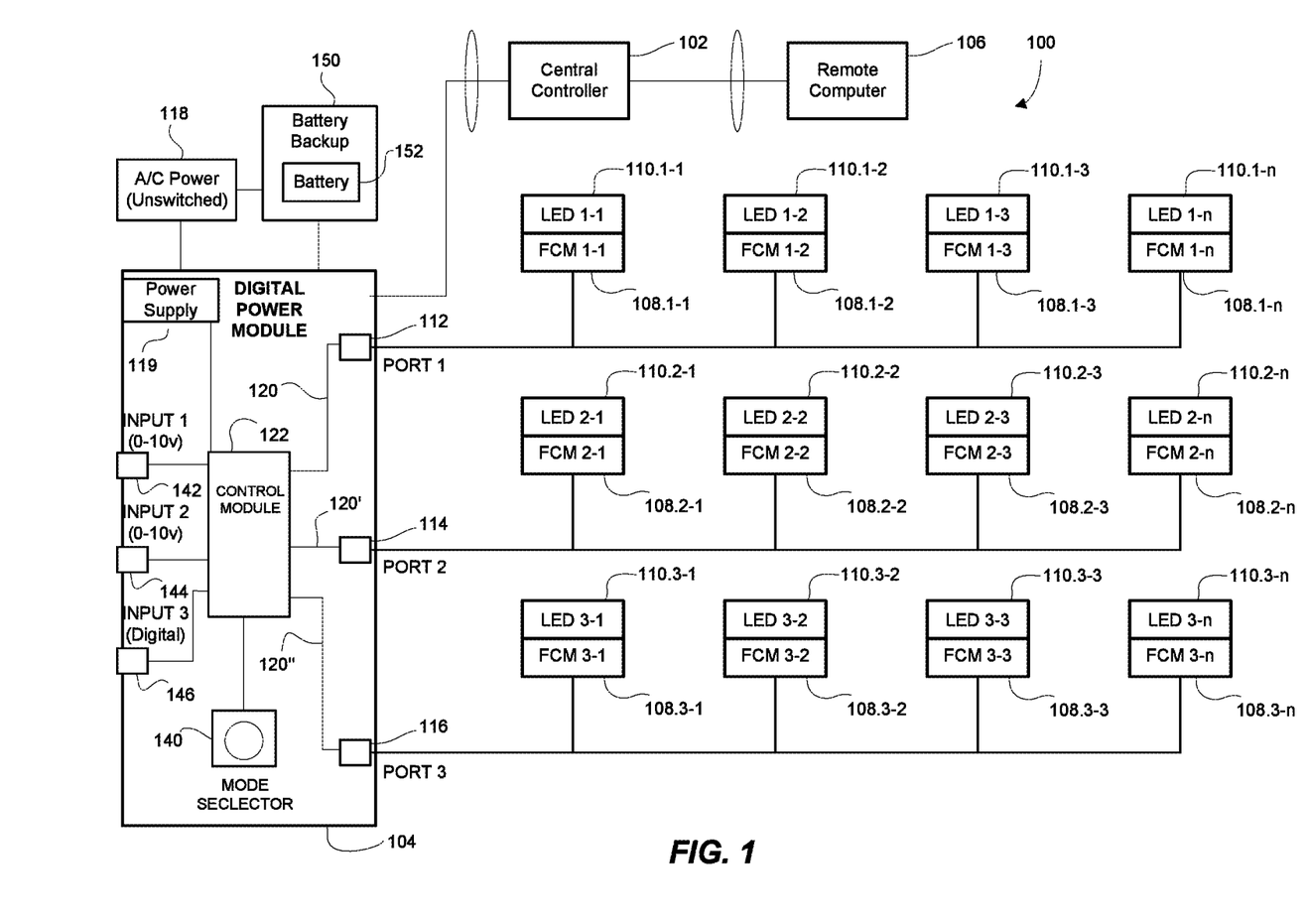
FIG. 1 is a block diagram of an embodiment of the distributed lighting system.

Referring to FIG. 1, a distributed lighting system 100 is illustrated that can include a central controller 102 that is coupled to a Digital Power Module (DPM) 104 via a network connection. The central controller may, in turn, be connected to a remote computer 106. The DPM 104 is coupled to at least one remote/distributed Fixture Control Module (FCM) 108.1-1 that controls an associated light fixture 110.1-1 (e.g., an LED light fixture). The DPM 104 may comprise a plurality of lighting channels/ports 112, 114, 116, each of which may be connected to a plurality of FCMs (108.1-1, 108.2-1, 108.3-1, etc.). The DPM 104 can include a power supply 119 adapted to receive an Alternating Current (AC) via main power input 118 (e.g., 120V/277V), and to transmit Direct Current (DC) via power output 120, 120', 120" (e.g., 48V) connected to the power input. The power outputs 120, 120', 120" supply power for each lighting channel 112, 114, 116 respectively. In addition, the DPM 104 can, in one embodiment, supply 5-500 mA of current to sensors such as daylight and occupancy sensors, or other types of sensors used for lighting control.

Figure 2:
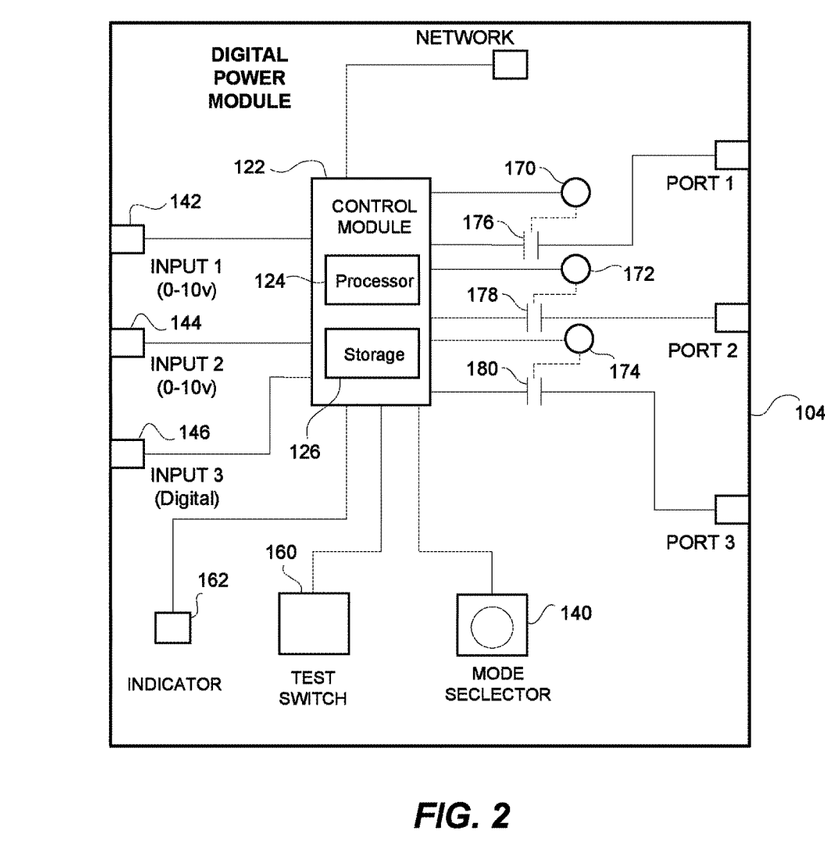
FIG. 2 is a block diagram of the Digital Power Module according to FIG. 1.

As can be seen in reference to FIGS. 1 and 2, three inputs 142, 144, 146 are provided for DPM 104. While the first two inputs 142, 144 are listed as "0-10v" inputs and the third input 146 is listed as a "digital" input, it is conceived that different configurations are possible or advantageous and fewer or greater numbers of inputs could be provided. As stated previously, the 0-10v inputs could be provided to receive a variable voltage signal from a dimmer or daylight sensor or the like, whereas the digital input could receive a digital input signal, such as from a digital controller (e.g., a DMX controller) or from a contact closure such as an occupancy sensor or the like. Many different configurations will be evident to those of skill in the art.

In one configuration, the DC power is transmitted/outputted to the FCMs (108.1-1, 108.2-1, 108.3-1, etc.) via low-voltage wiring, such as class 2 wiring comprising for example, CAT 5/6/6E cable which, for example, can be terminated with RJ-45 modular connectors. The wiring can be connected to one of the power outputs 120, 120', 120" and to the associated one of the lighting channel/port 112, 114, 116. In an embodiment, each power output and the associated lighting channel/port can be contained within one RJ-45 modular receptacle. It can further be seen in FIG. 1 that the FCMs can be connected to the wiring in parallel, in a daisy chain configuration. In this manner, failure of any single FCM (e.g., the FCM typically fails open) would not adversely impact any of the remaining FCMs (and therefore any of the other light fixtures) connected on the channel. The DPM 104 also provides control signals to the FCMs, such as digital control signals (e.g., DMX and the like), via the low-voltage wiring and/or in one configuration, via a wireless connection. Each lighting channel/port 112, 114, 116 can form a digital interface for transmitting a digital control signal to the FCMs and for receiving data from the FCMs. Alternatively, the digital interface can include a wireless interface.

The DPM 104 may further include a control module 122 including a processor 124 (see, FIG. 2) which may comprise a Microprocessor, a Field Programmable Gate Array, a Digital Signal Processor, a Microcontroller or the like) which may further include a transmitter/transceiver for processing control inputs and for transmitting control signals to the FCM(s), for example, via the low voltage wiring and/or wirelessly. The control module 122 may further comprise a storage 126 that is accessible by the processor 124. Each FCM (108.1-1, 108.2-1, 108.3-1, etc.) is operable to receive the control signal(s) transmitted from the DPM 104 and, based on such control signals, is operable to control drivers (not shown) which drive the various color channels of the LED lighting fixtures (110.1-1, 110.2-1, 110.3-1, etc.), which may include pulse-width modulation (PWM) and/or other control methods and techniques. The FCMs 108.1-1 may also be provided with a processor 130.1-1 that may include a receiver/transceiver for receiving and processing the control signals and for controlling the drivers. The FCMs (108.1-1, 108.2-1, 108.3-1, etc.) may also be operable to transmit information and/or control signals to the DPM 104 in the same manner.

Preferably, the FCMs (108.1-1, 108.2-1, 108.3-1, etc.) are capable of being set to receive data addressed to one or more data addresses (for example, 4 data addresses corresponding to 4 color channels) within an address space of for example, up to 512 addresses.

Also illustrated in FIG. 1 is battery backup 150 including a battery 152. The battery backup 150 is connected to the building power 118 and to the DPM 104 and is adapted to provide emergency power to DPM 104 and FCMs in the event of an interruption in to building power 118.

Figure 3:
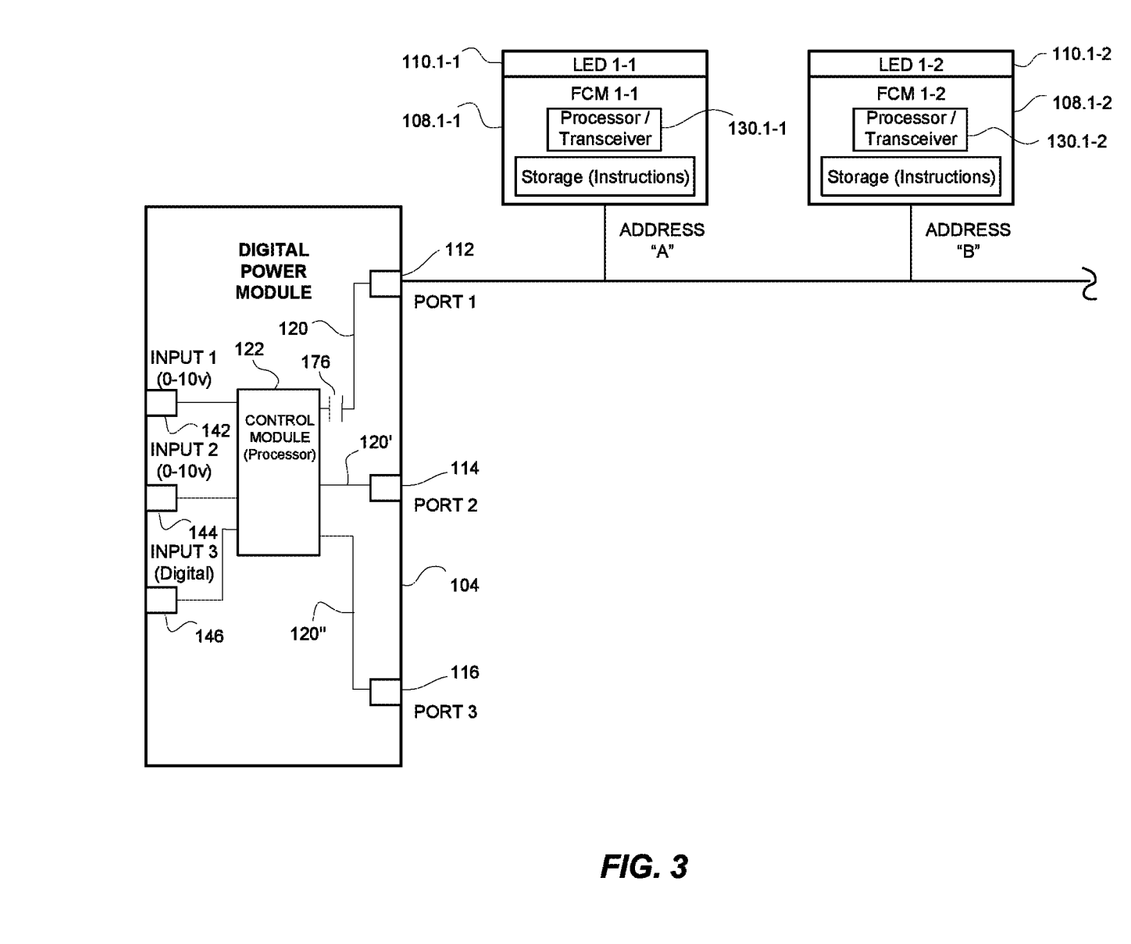
FIG. 3 is a block diagram of the various Fixture Control Modules according to FIG. 1.

Reference will now be made to the various flow diagrams depicted in FIGS. 4 and 5 with further reference to the block diagrams in FIG. 1-3. During normal operation, the DPM 104 receives power from the main power input 118 and thereby provides power to the FCMs (108.1-1, 108.2-1, 108.3-1, etc.) and light fixtures (110.1-1, 110.2-1, 110.3-1, etc.). For example, the DPM can receive A/C power (e.g., 110/220 volt) power via the main power input and can transmit D/C power (e.g., 48 volt) to the FCMs via the low voltage wiring. The DPM 104 also receives control signals 202 from one or more control inputs 142, 144, 146 and provides control signals (e.g., one or more digital control signals) to the various FCMs (108.1-1, 108.2-1, 108.3-1, etc.) based on the control inputs. The control signals provided to the FCMs can be, for example, various intensity values for each color channel in each light fixture, ranging from off (e.g., zero) to full on (e.g., 100 or 254) and values in between, or some other suitable range or values.

The output signal can include address(es) to control LED light fixture(s) 204 that are connected to an associated FCM. As previously noted, the various FCMs are programmed to accept data that include one or more data addresses, which could correspond to different color channels for the LED light fixture associated with a particular FCM. The FCM (108.1-1, 108.2-1, 108.3-1, etc.) will receive the output from the DPM 104 and will check the address(es) 206. If the address(es) do not match 208 the data in FCM (108.1-1, 108.2-1, 108.3-1, etc.), the FCM will take no action and continue monitoring for the output signal 210 from the DPM 104. If, however, the output signal includes data that matches one or more addresses of the FCM (108.1-1, 108.2-1, 108.3-1, etc.), the FCM will process the received control signal 212. The FCM (108.1-1, 108.2-1, 108.3-1, etc.) will then control the associated LED light fixture based on the received control signal 214.

As previously stated, the data corresponding to the addresses in the output signal from the DPM 104 could, in one configuration, comprise up to 512 addresses. This would provide a wide variety of control options for a plurality of connected LED light fixtures. For example, many LED light fixtures include several distinct color channels in a single light fixture (for example Red, Green, Blue and White (RGBW)) and each color channel can be variably illuminated and mixed to create virtually any desired color. Each color channel for an LED light fixture could have an associated address such that for one predefined lighting scene, an LED light fixture receives predefined data to operate the associated LED on each of four channels in a first manner. However, for a second predefined lighting scene, an LED light fixture could receive second predefined data to operate the associated LED on each of four channels in a second manner. It can be seen that many different LED light fixtures could be individually and distinctly controlled based on the relatively large number of available addresses.

Figure 4:
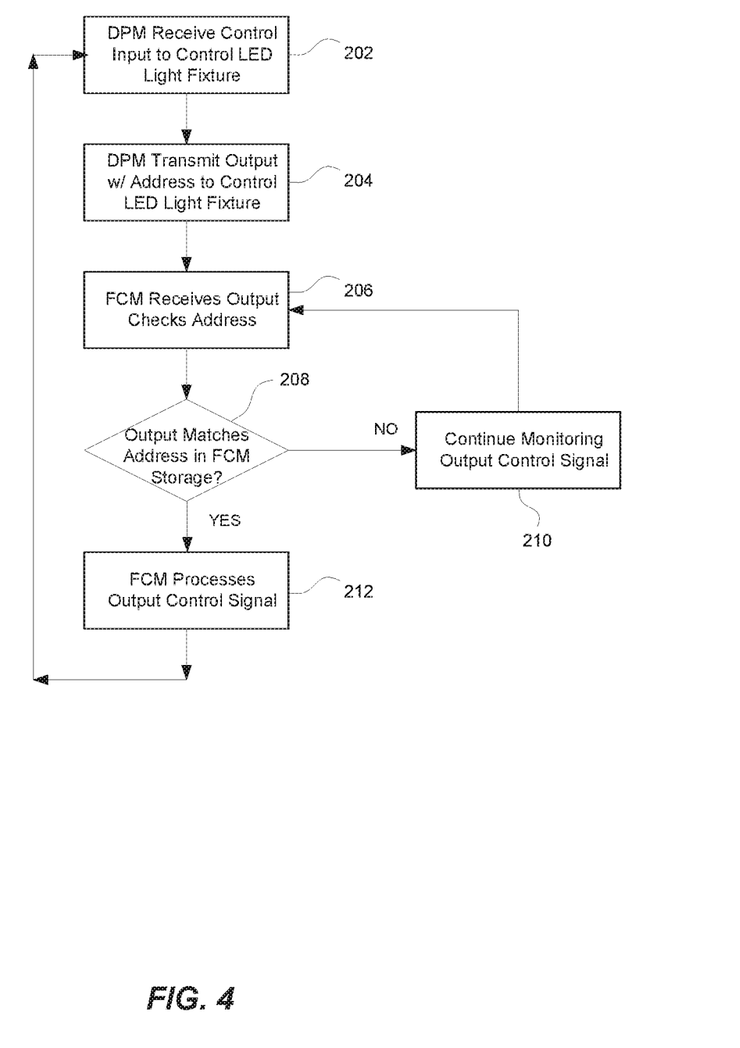
FIG. 4 is a flow diagram of a control scheme for transmitting a control signal from the Digital Power Module to the Fixture Control Module according to the distributed lighting system of FIG. 1.
Figure 5:
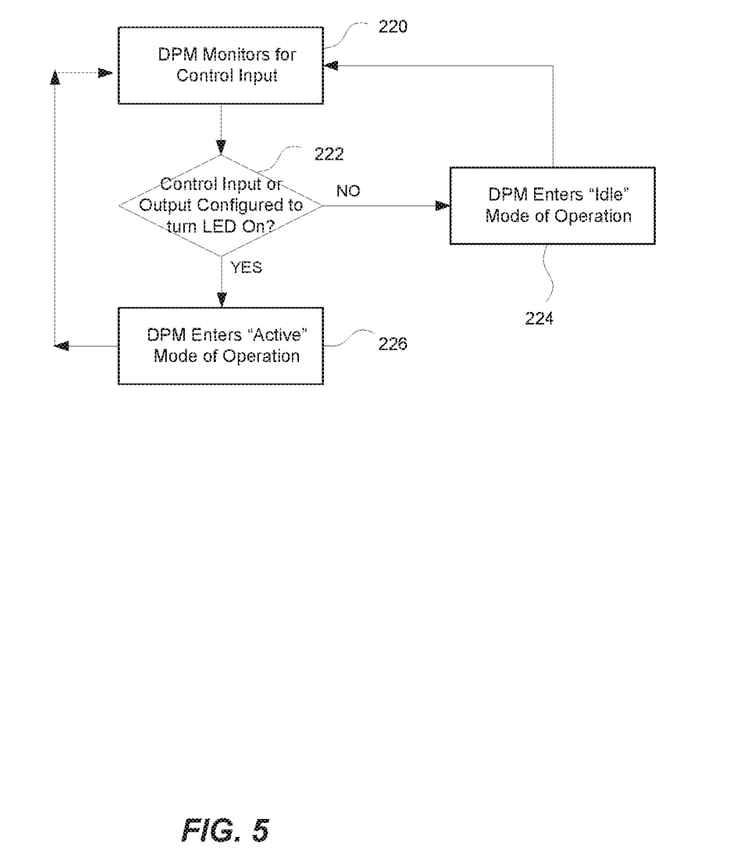
FIG. 5 is a flow diagram of a control scheme for turning off the output from the Digital Power Module according to the distributed lighting system of FIG. 1.

As can be seen with reference to FIGS. 4 and 5, during normal operation, the DPM 104 is in an "active power mode" and the power supply transmits power to the FCMs (108.1-1, 108.2-1, 108.3-1, etc.) and associated light fixtures (110.1-1, 110.2-1, 110.3-1, etc.) via the power output 120, 120', 120", which can be substantially constant power (e.g., 48 V D/C power) transmitted via low-voltage CAT 5/6/6E wires. In addition, the control module 122 transmits control signals to the FCMs (108.1-1, 108.2-1, 108.3-1, etc.), which in some instances, could comprise signals using a DMX protocol. During periods of limited use or non-use, some or all of the LED lights within the lighting fixtures (110.1-1, 110.2-1, 110.3-1, etc.) connected to the DPM 104 will be off. However, even during periods of non-use, the FCMs (108.1-1, 108.2-1, 108.3-1, etc.) can draw a relatively small amount of power. For some systems, each FCM can draw up to ⅓ Watt during non-use (e.g., when the associated light fixture is off), which can amount to a not insignificant total of 6-8 Watts for a 48 fixture system. For lighting systems throughout a facility, this can add up to a significant amount of power usage when none of the light fixtures are being used (e.g., at night). Thus, the control module is operable to set (or maintain) the DPM 104 in the active power mode when the digital/output control signal is configured to cause one or more FCMs connected to the DPM to turn the associated LED light fixture on.

Turning now to FIG. 5, the DPM continuously and/or periodically monitors a control input signal and/or the output signal 220. To conserve power, the DPM 104 is configured to automatically enter an "idle power mode" 224 during periods of non-use of the connected light fixtures. In particular, when the control module 122 detects "off" control signals for all light fixtures (or no "on" signals), the control module 122 is operable to cease providing power to the associated power outputs 120, 120', 120" and thus to the associated FCMs (108.1-1, 108.2-1, 108.3-1, etc.). Thus, the control module is operable to set (or maintain) the DPM 104 in the idle power mode when the digital/output control signal is configured to cause all of the FCMs connected to the DPM to turn the associated LED light fixture off.

Idle mode can be accomplished by turning the power supply 119 off, which may or may not be integral with the control module 122, or putting the power supply 119 into a "sleep" or idle mode wherein no power is supplied to any of the power outputs 120, 120', 120" or to the ports/light channels 112, 114, 116, provided power is maintained to the control module. Alternatively, the control module 122 is operable to control switches 170, 172, 174 having associated contacts 176, 178, 180 respectively that are positioned in series with the power supply 119 and the power outputs 120, 120', 120" (e.g., between the power supply and the power outputs and lighting channel ports). The DPM can operate the switches to in tandem/simultaneously interrupt power to all of the power outputs 120, 120', 120", or can operate the switches independently to selectively interrupt power to one or more of the power outputs.

If the DPM 104 is in "idle mode" and the control module 122 detects an "on" control signal for any light fixture, the control module is operable to automatically revert the DPM 104 back to the "active mode" 226 wherein power is supplied to the power outputs 120, 120', 120" and thus to the FCMs (108.1-1, 108.2-1, 108.3-1, etc.), where the process described in FIG. 4 will be followed. This can be accomplished by reversing the method used to enter idle mode. For example, this can be accomplished by turning the power supply on or waking the power supply from the "sleep mode", such that, power is again supplied to the ports/light channels, and/or by closing the one or more sets of contacts 176, 178, 180 in series with the power supply. Thus, the control module is operable to automatically switch between the active power mode and the idle power mode.

As discussed above, the DPM 104 can be configured to cease providing power to all power outputs 120, 120', 120" together and/or simultaneously when in the idle mode, and to provide power to all power outputs 120, 120', 120" together/simultaneously when in the active mode. That is, the DPM 104 can be configured to enter idle mode when all lights connected to the DPM 104 are off, and the DPM 104 can be configured to enter active mode when any one of the light fixtures (110.1-1, 110.2-1, 110.3-1, etc.) connected to the DPM 104 is on. However, it is also contemplated that the DPM 104 can be configured to selectively enter idle mode and active mode for individual power outputs and ports/lighting channels. That is, the DPM 104 can enter idle mode for a power output 120, 120', 120" when all lights (110.1-1, 110.2-1, 110.3-1, etc.) connected to the associated port/light channel 112, 114, 116 are off and can enter active mode for that power output when any light connected to that port/lighting channel is on, regardless of the status of lights connected to ports/lighting channels associated with different power outputs. Thus, the DPM can be configured to be in any combination of either the active power mode or idle power mode for each power output. For example, for a DPM having first and second power outputs, the DPM can be configured to be any one of Active/Active, Active/Idle, Idle/Active or Idle/Idle power modes for the first and second power outputs, respectively.

To facilitate per-port, selective idle power modes, the DPM 104 can be programmed with the locations of the FCMs (108.1-1, 108.2-1, 108.3-1, etc.) on the various ports/lighting channels, for example, by data address. Alternatively, the FCMs (108.1-1, 108.2-1, 108.3-1, etc.) can be operable to transmit or advertise their data address(es) to the DPM 104 (e.g., via one of the ports), which the DPM 104 can use to determine the locations of the FCMs (108.1-1, 108.2-1, 108.3-1, etc.) on the various ports/lighting channels 112, 114, 116.

In some situations, it may not be desirable for the DPM to enter the idle mode during certain events. Therefore the DPM can be configured such that, upon/during the occurrence of certain predetermined exception events, the DPM 104 is operable revert to (or remain in) the active power mode even when it is in, or would otherwise enter, the idle power mode in a manner discussed herein. Examples of such predetermined exception events include: loss of the control input signal, loss of the control output signal (e.g., failure of the DPM to transmit the control output signal), failure or lockup of the processor of the DPM, and failure of the source of electrical power and/or entering battery backup power.

Preferably, the FCMs (108.1-1, 108.2-1, 108.3-1, etc.) are configured to enter a default mode in the event the FCMs are provided with power but no data signal, which could comprise, for example, an emergency mode to operate the associated light fixture (110.1-1, 110.2-1, 110.3-1, etc.) at a predefined intensity and/or color, such as white light at 25% intensity. However, to ensure that the FCM can enter such emergency mode, the DPM 104 preferably is operable to remain in active mode (or to revert from idle mode to active mode) to supply power to the FCMs (108.1-1, 108.2-1, 108.3-1, etc.) in the event of a failure of the control module 122 and/or processor 124 of the DPM 104.

In the event of a failure of the control module 122 and/or processor 124 (e.g., if the processor locks up or malfunctions), the DPM 104 might cease sending control signals to the FCMs (108.1-1, 108.2-1, 108.3-1, etc.) but still be operable to provide power to the FCMs (108.1-1, 108.2-1, 108.3-1, etc.). In the event of such a failure while the DPM 104 is in the idle mode, the DPM 104 is operable to automatically revert to the active mode to resume supplying power to the FCMs (108.1-1, 108.2-1, 108.3-1, etc.). To accomplish this, the DPM 104 can include a "one-shot function" which can comprise a hardware and/or firmware watchdog circuit which, under normal operation receives a regular, periodic watchdog signal from the control module 122 and/or processor 124 (e.g., every 1.0 second, or a longer or shorter period). However, if the control module 122/processor 124 malfunctions and thus fails to send the watchdog signal within a predetermined period of time (e.g., 1.5 seconds, or a longer or shorter period), the watchdog circuit is operable to revert the DPM 104 from idle mode to active mode. Thus, during normal operation the DPM 104 can transition between the active and idle modes as described above, but when the controller 122 and/or processor 124 malfunctions, the DPM 104 will revert to (or remain in) active mode to provide power to the FCMs (108.1-1, 108.2-1, 108.3-1, etc.).

Alternatively, the control module 122 can be configured to send a periodic control signal (e.g., at least one DMX frame every 60 seconds) and the DPM 104 can be configured to sense if the periodic control signal has been generated/sent. If no periodic control signal is detected for a predetermined amount of time (e.g., more than 180 seconds) and the DPM 104 is in idle mode, then the DPM 104 reverts to active mode to supply power to the FCMs (108.1-1, 108.2-1, 108.3-1, etc.).

The system can also include a battery backup 150 such that in the event that power is lost (e.g., power lost to the building), the DPM 104 would still have power and would still be able to provide power, for example to select FCMs (108.1-1, 108.2-1, 108.3-1, etc.) that can be designated as emergency light fixtures. Preferably, the DPM 104 will not go into idle mode (or will revert from idle mode to active mode) when the DPM 104 is in the battery backup mode because all of the lights are not off. Accordingly, all (or a select number) of the power outputs 120, 120', 120" could be provided power from the battery backup source 150.

As an alternative, if the DPM 104 is operating on a battery backup 150, the DPM 104 can be operable to supply power only to selected power outputs 120, 120', 120" in order to supply power only to certain light fixtures (110.1-1, 110.2-1, 110.3-1, etc.) designated as "emergency" lights (and to turn off all other ports). This provides the advantage of powering only the ports with lights that are designated as "emergency" lights, which in turn, would extend the battery life. This can be accomplished by selectively closing or opening one or more contacts 176, 178, 180 in series with the battery backup 150 and the power outputs to be turned on and off, respectively, or other suitable methods or techniques.

To determine which ports to power and which ports to turn off, the DPM 104 can be operable to identify which ports have and/or do not have designated emergency lights. The DPM 104 can be programmed with the locations and ports of the FCMs (108.1-1, 108.2-1, 108.3-1, etc.), which operate as emergency lights, for example, by data address, which the DPM 104 can use to determine the ports to power by battery backup 150 in the event of a power loss. Alternatively, the FCMs (108.1-1, 108.2-1, 108.3-1, etc.) can be operable to transmit or advertise if they are set to operate as emergency lights, which the DPM 104 will receive on the ports associated with such FCMs and the DPM can use that information to determine the ports to power.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A lighting control system comprising:
   a digital power module (DPM) including:
     a control module;
     a power supply;
     a power output connected to the power supply;
     at least one control input operable to receive an input control signal; and
     a digital interface;
   a fixture control module (FCM) connected to the digital interface and the power output of the DPM, and the FCM having an associated LED light fixture connected thereto;
   the DPM being adapted to transmit a digital control signal to the FCM through the digital interface for controlling the FCM and the LED light fixture, where the digital control signal is based on the input control signal;
   the DPM being adapted to transmit power to the FCM through the power output;
   the DPM having an active power mode wherein the DPM transmits power to the FCM via the power output and the DPM transmits the digital control signal to the FCM via the digital interface;
   the DPM having an idle power mode wherein the DPM does not transmit power to the FCM via the power output, and wherein the DPM is operable to monitor the at least one control input;
   the control module setting the DPM in the active power mode when the digital control signal is configured to cause the FCM to turn the associated LED light fixture on; and
   the control module setting the DPM in the idle power mode when the digital control signal is configured to cause the FCM to turn the associated LED light fixture off.

2. The lighting control system of claim 1, wherein:
   the DPM comprises a set of contacts between the power supply and the power output; and
   the control module is operable to close the set of contacts in the active power mode and to open the set of contacts in the idle power mode.

3. The lighting control system of claim 1, wherein:
   the FCM includes an address;

the DPM has an address storage containing the address of the FCM;

the digital control signal includes one or more addresses associated therewith;

the DPM is operable to compare the one or more addresses associated with the digital control signal to the address of the FCM in the address storage to determine if the digital control signal comprises a signal to control the FCM.

4. The lighting control system of claim 3, wherein:

the FCM is operable to communicate the address of the of FCM to the DPM; and the DPM is operable to receive and store the address of the FCM in the address storage.

5. The lighting control system of claim 1, wherein:

during a predetermined exception event, the DPM is configured to be in the active mode when the digital control signal is configured to cause the FCM to turn the LED light fixture off.

6. The lighting control system of claim 5, wherein:

the DPM includes a battery backup having a battery;

the DPM has a normal power mode wherein power is supplied to the DPM and FCM by the power supply, and has a backup power mode wherein power is supplied to the DPM and FCM by the battery backup; and the predetermined exception event comprises the DPM being in the backup power mode.

7. The lighting control system of claim 5, wherein:

the predetermined exception event comprises a loss of the control input signal.

8. The lighting control system of claim 5, wherein:

the predetermined exception event comprises a failure of the DPM to transmit the digital control signal.

9. The lighting control system of claim 5, wherein:

the control module is operable to generate the digital control signal; and the predetermined exception event comprises a malfunction of the control module.

10. A lighting control system comprising:

a digital power module (DPM) including:
   a control module;
   a power supply;
   a first power output connected to the power supply;
   at least one control input operable to receive an input control signal; and
   a digital interface;

a first plurality of fixture control modules (FCMs) connected to the digital interface and the first power output, each of the first plurality of FCMs having an LED light fixture associated therewith and controlled by the respective FCM;

the DPM being adapted to transmit the digital control signal to the first plurality of FCMs through the digital interface for individually controlling each FCM and associated LED light fixture;

the DPM being adapted to transmit power to the first plurality of FCMs through the first power output;

the DPM having a first active power mode wherein the DPM transmits power to the FCM via the first power output and the DPM transmits the digital control signal to the FCM via the digital interface;

the DPM having a first idle power mode wherein the DPM does not transmit power to the FCM via the first power output, and wherein the DPM is operable to monitor the at least one control input;

the control module setting the DPM in the first active power mode when the digital control signal is configured to cause any one of the first plurality of FCMs to turn the associated LED light fixture on; and the control module setting the DPM in the first idle power mode when the digital control signal is configured to cause each one of the first plurality the FCMs to turn the associated LED light fixture off.

11. The lighting control system of claim 10, wherein:

each of the first plurality of FCMs includes an address;

the DPM has an address storage containing the address of each of the first plurality of FCMs;

the digital control signal includes one or more addresses; and the control module is operable to compare the one or more addresses in the digital control signal to the address storage to determine if the digital control signal comprises a signal to control any one of the first plurality of FCMs.

12. The lighting control system of claim 11, wherein:

each of the first plurality of FCMs is operable to communicate the address of the of FCM to the DPM; and the DPM is operable to receive and store the address of each of the first plurality of FCMs in the address storage.

13. The lighting control system of claim 10, wherein:

the DPM comprises a first set of contacts between the power supply and the first power output; and the control module is operable to close the first set of contacts in the first active power mode and to open the first set of contacts in the first idle power mode.

14. The lighting control system of claim 10, wherein:

during a predetermined exception event, the DPM is configured to be in the first active mode when the digital control signal is configured to cause each of the first plurality of FCMs to turn the associated LED light fixture off.

15. The lighting control system of claim 14, wherein:

the DPM includes a battery backup having a battery;

the DPM has a normal power mode wherein power is supplied to the DPM and FCM by the power supply, and has a backup power mode wherein power is supplied to the DPM and FCM by the battery backup; and the predetermined exception event comprises the DPM being in the backup power mode.

16. The lighting control system of claim 14, wherein:

the predetermined exception event comprises a loss of the control input signal.

17. The lighting control system of claim 14, wherein:

the predetermined exception event comprises a failure of the DPM to transmit the digital control signal.

18. The lighting control system of claim 14, wherein:

the control module is operable to generate the digital control signal; and the predetermined exception event comprises a malfunction of the control module.

19. The lighting control system of claim 10, further comprising:

the digital power module (DPM) including a second power output connected to the power supply;

a second plurality of fixture control modules (FCMs) connected to the digital interface and the second power output, each of the second plurality of FCMs having an LED light fixture associated with and controlled by the respective FCM;

the DPM being adapted to transmit the digital control signal to the first and second plurality of FCMs through the digital interface for independently controlling the first and second plurality of FCMs and the associated LED light fixture;

the DPM being adapted to transmit power to the second plurality of FCMs through the second the power output;

the DPM having a second active power mode wherein the DPM transmits power via the second power output and the DPM transmits the digital control signal via the digital interface;

the DPM having a second idle power mode wherein the DPM does not transmit power via the second power output, and wherein the DPM is operable to monitor the at least one control input;

the control module setting the DPM in the second active power mode when the digital control signal is configured to cause any one of the second plurality of FCMs to turn the associated LED light fixture on;

the control module setting the DPM in the second idle power mode when the digital control signal is configured to cause each one of the second plurality the FCMs to turn the associated LED light fixture off; and the DPM being configured to be in any combination of one of the first active and idle power modes and one of the second active and idle power modes.

20. The lighting control system of claim 19, wherein:

each FCM of the first and second pluralities of FCMs includes an address;

the DPM has an address storage containing the address of each of the first and second pluralities of FCMs;

the digital control signal includes one or more addresses; and the DPM is operable to compare the one or more addresses in the digital control signal to the address storage to determine if the digital control signal comprises an on signal comprising an address of one of the FCMs of the first and second pluralities of FCMs.

21. The lighting control system of claim 20, wherein:

each FCM of the first and second pluralities of FCMs is operable to communicate the address of the of FCM to the DPM; and the DPM is operable to receive the address of each FCMs of the first and second pluralities of FCMs and to store the address of each of FCM of the first and second pluralities of FCMs in the address storage.

22. The lighting control system of claim 19, wherein:

the DPM comprises a first set of contacts between the power supply and the first power output;

the control module is operable to close the first set of contacts in the first active power mode and to open the first set of contacts in the first idle power mode;

the DPM comprises a second set of contacts between the power supply and the second power output;

the control module is operable to close the second set of contacts in the second active power mode and to open the second set of contacts in the second idle power mode.

23. The lighting control system of claim 19, wherein:

during a predetermined exception event, the DPM is configured to be in the first and second active modes when the digital control signal is configured to cause the first and second pluralities of FCMs to turn the associated LED light fixture off.

24. The lighting control system of claim 23, wherein:

the DPM includes a battery backup having a battery;

the DPM has a normal power mode wherein power is supplied to the DPM, and has a backup power mode wherein power is supplied to the DPM by the battery backup; and the predetermined exception event comprises the DPM being in the backup power mode.

25. The lighting control system of claim 23, wherein:

the predetermined exception event comprises a loss of the control input signal.

26. The lighting control system of claim 23, wherein:

the predetermined exception event comprises a failure of the DPM to transmit the digital control signal.

27. The lighting control system of claim 23, wherein:

the control module is operable to generate the digital control signal; and the predetermined exception event comprises a malfunction of the control module.

28. The lighting control system of claim 1, wherein:

the control module is operable to automatically switch between the active power mode and the idle power mode.

29. The lighting control system of claim 10, wherein:

the control module is operable to automatically switch between the first active power mode and the first idle power mode.

30. The lighting control system of claim 19, wherein:

the control module is operable to automatically switch between the first active power mode and the first idle power mode; and the control module is operable to automatically switch between the second active power mode and the second idle power mode.

* * * * *